Dec. 16, 1952    P. F. ROSSMANN ET AL    2,621,926
WINDOW REGULATING DEVICE
Filed April 10, 1948    2 SHEETS—SHEET 1
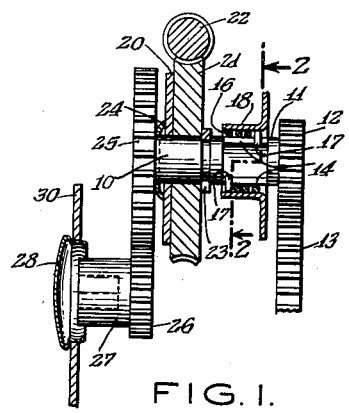
FIG. 1.
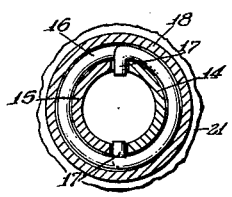
FIG. 2.
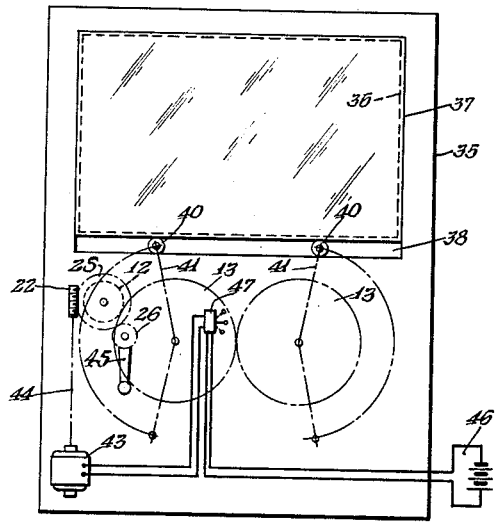
FIG. 3.
FIG. 4.
INVENTORS.
PETER F. ROSSMANN
AND KARL RATH
BY
ATTORNEY.

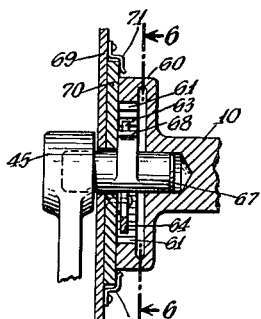
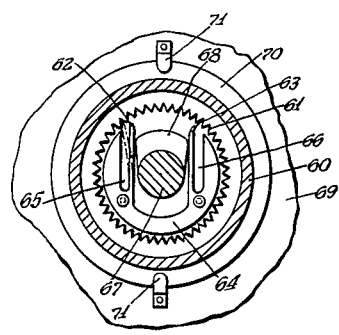
FIG. 5.  FIG. 6.
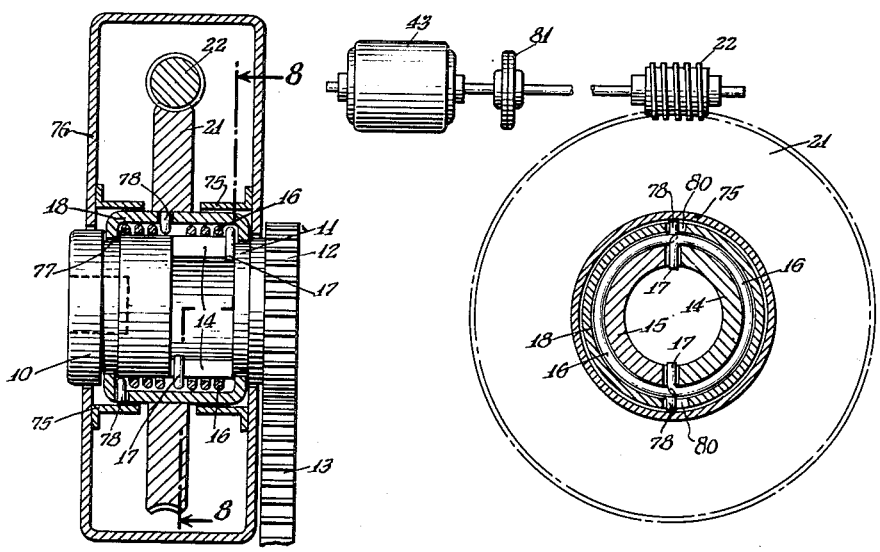
FIG. 7.  FIG. 8.

Patented Dec. 16, 1952

2,621,926

UNITED STATES PATENT OFFICE 2,621,926

WINDOW REGULATING DEVICE

Peter F. Rossmann, Morristown, N. J., and Karl Rath, New York, N. Y., assignors to Hupp Corporation, Cleveland, Ohio, a corporation of Virginia Application April 10, 1948, Serial No. 20,243

5 Claims. (Cl. 268—124)

1

The present invention relates to devices for the operation of windows, more particularly to improvements in window regulators for automobiles and other vehicles.

The known types of automobile window regulators using an electric, pneumatic or hydraulic motor as a driving source, have been found unsatisfactory in practice mainly for the reason that they do not provide for a safe and reliable manual operation, in the event of failure of the automatic system.

As is evident, both damage and discomfort may result if it is impossible to close the window of an automobile to keep out weather or to prevent theft through failure of the automatic window regulator system. Likewise, in the event of accident when the doors or the windows become jammed and the automatic system becomes damaged, escape of the occupants may become impossible.

Accordingly, it is an object of the present invention to overcome the aforementioned and other drawbacks and defects inherent in prior window control devices by providing an improved window regulating system designed for either automatic or manual operation in a simple and reliable manner.

Other objects of the invention are to provide a combined manual and automatic window control device for automobiles or the like which is both simple in construction and easy to manufacture; which will require little space and may be easily and readily installed in an automobile door; which will enable a window normally to be controlled automatically in either direction, while at the same time enabling an easy and instant manual operation in cases of emergency or failure of the automatic system; and which will enable in general the manual and automatic control devices to be used discriminately at the discretion of the operator, to suit his personal choice or any existing operating requirements or conditions that may arise.

Further objects and novel aspects of the invention will become more apparent from the following detailed description of a few practical embodiments, reference being had to the accompanying drawings forming part of this specification and wherein:

Figure 1 is a cross-sectional view through a combined manual and automatic window regulating device constructed in accordance with the principles of the invention;

Figure 2 is an enlarged cross-section through the spring clutch embodied in and taken on line 2—2 of Figure 1;

2

Figure 3 shows in diagrammatic fashion an automobile door equipped with a window regulating system of the type according to the invention;

Figure 4 is a cross-sectional view similar to Figure 1, showing a modified form of a window regulator constructed in accordance with the invention;

Figure 5 is a partial cross-sectional view showing an automatic clutch for the manual operating member and suitable for use in connection with window regulating devices according or similar to those described by the invention;

Figure 6 is a cross-section taken on lines 6—6 of Figure 5;

Figure 7 is a vertical cross-section through a further modified window regulating device constructed in accordance with the invention; and Figure 8 is a cross-section taken on lines 8—8 of Figure 7.

Like reference characters identify like elements in the different views of the drawings.

Referring to Figure 1 and 2, there is shown at 10 a primary or first shaft arranged to be driven by either an electric motor or manually by means of a hand crank or the like and being coupled with a secondary shaft 11 through a uni-bi-directional spring clutch or the equivalent, said secondary shaft driving a gear 12 which meshes with a further gear 13 of any known type of window operating mechanism, such as indicated schematically in Figure 3 and described hereafter.

The spring clutch shown in Figures 1 and 2 comprises a pair of sector-shaped interlocking lugs 14 and 15, Figure 2, the former being attached to or integral with the shaft 10 and the latter being attached or integral with the shaft 11. A coil spring 16 encircling the lugs 14 and 15 has its hooked ends 17 interposed between the adjoining end faces of said lugs, in such a manner that upon rotation of lug 14 or the associated shaft 10 in either direction, the spring will be wound up or contracted by virtue of one end of the lug engaging the inner face of one of the hooked ends 17, thereby releasing the spring from its normal frictional engagement with the surrounding cylindrical housing 18, which latter may form a part of a case or a support for the entire coupling device. As a result, rotational movement may be freely transmitted from shaft 10 to shaft 11 in either direction of rotation. On the other hand, upon rotation of lug 15 or the associated shaft 11 in either direction, the spring 16 will be unwound or expanded by virtue of one of the ends of the lug engaging the outer face of one of the hooks 17, thereby tightening the spring further against the housing 18 and blocking transmission of movement in the direction from shaft 11 to shaft 10. Such a clutch, being bi-directional as to sense of rotation and uni-directional as to the sense of transmission of torque or power, will enable the operation of a window by way of gears 12 and 13 by rotating shaft 10 either manually or automatically, while at the same time preventing the window from reacting in the reverse direction upon the driving motor or manual operating handle due to gravity or other forces.

There is furthermore shown in Figure 1 a friction disk 20 keyed to the shaft 10, said disk being held in frictional engagement with a worm wheel 21 arranged to rotate freely upon said shaft and being driven by a worm gear 22. Frictional engagement between disk 20 and worm wheel 21 is maintained by the provision of a retaining snap ring 23 at the opposite side of worm wheel 21 and a disk-shaped spring or resilient split washer 24 interposed between the outer face of disk 20 and a gear 25 mounted upon the outer end of shaft 10. Gear 25 meshes with a similar gear 26 of smaller number of gear teeth and having a hub 27 which is provided with a slot or rectangular recess adapted to receive a hand crank or equivalent operating member, for manually rotating shaft 10 and regulating the window, as will be further understood from the following.

Item 30 represents the inside panel of an automobile door or the like which is provided with a suitable opening for applying the hand crank or equivalent operating member, said opening being normally closed by a snap-on type spring plug 28.

Worm 22 is driven by an electric motor through a rigid or flexible shaft, whereby the window may be raised or lowered by starting the motor in either direction by means of a reversible and preferably self-centering electric control switch. In case of failure of the motor or any other emergency, button 28 is removed and a hand crank or the like, which may be carried in the door or glove compartment of an automobile, applied for manual operation of the window.

During the latter operation, it will be necessary for the operator to overcome the frictional force between the disk 20 and worm wheel 21 and it is for this purpose that the reducing gear or speed transformer 25, 26 is provided in order to minimize the manual effort in overcoming the friction between disk 20 and worm 21. At the same time, the worm wheel 21 being unable to rotate against worm 22 will serve as a lock or abutment for the rotation of disk 20 and shaft 10, thereby limiting the transmission of the manual torque in the direction of the window control gears 12 and 13 by way of shafts 10 and 11 and the uni-bi-directional spring clutch, in a manner readily understood from the above.

The frictional force between disk 20 and worm wheel 21 is advantageously so adjusted by a suitable design of the spring washer 24 or an equivalent resilient pressure member, as to act as an overload release means by allowing the disk 20 to slip relative to worm wheel 21 when the window reaches the limit position or becomes stuck or otherwise restrained, such as by a person placing his hand against the edge of the window pane in an intermediate position. In this manner, the load upon the motor will be automatically relieved upon reaching a predetermined excess torque and damage to the mechanism as well as injury to persons are substantially avoided.

Figure 3 shows diagrammatically a window operating mechanism mounted within an automobile door and combined with a regulator system of the type according to the invention. Numeral 35 indicates the door, 36 represents the window frame and 37 a window pane mounted upon a support or channel-shaped member 38. The latter serves as a guide for a pair of rollers 40 which are attached to the ends of links 41 each of which is in turn connected to one of a pair of driving gears 13 arranged in mutual meshing relation, one of said gears corresponding to gear 13 shown in Figure 1 and in turn meshing with the driving gear 12 of the window control mechanism. Item 45 is a hand crank shown in the inserted position for rotating gears 26 and 25, the worm gear 22 being driven by an electric motor 43 through a shaft 44. The latter is arranged for rotation in either direction by energizing it by a suitable power source such as a battery 46 through a reversible preferably self-centering electric control switch 47, in the manner shown in the drawing and readily understood by those skilled in the art.

Referring to Figure 4, there is shown a modified arrangement similar to Figure 1 and including means for automatically releasing or reducing the frictional force between disk 20 and worm wheel 21 during the manual window operation. For this purpose, the frictional force is produced by magnetic attraction in addition to or without the spring pressure provided by washer 24 or an equivalent compression spring. In the embodiment illustrated, both the worm wheel 21 and friction disk 20 are of magnetic material, there being furthermore provided a magnetic winding 50 mounted in an annular recess of wheel 21 and connected to a pair of slip rings 52 and 53 engaged by brushes or sliding contacts 54 and 55 for electrically connecting the winding 50 in series with the circuit energizing the motor 43. The motor shown in this embodiment is of the type comprising separate forward and reverse windings which are connected to a single-pole self-centering switch 47. It is understood, however, that a normal motor may be employed in connection with a double-pole reversible switch for the purpose of the invention.

In an arrangement of the type aforedescribed, the current flowing through the motor circuit during the automatic control of the window passes through the magnetic winding 50, whereby to produce a sufficient frictional force between disk 20 acting as an armature for the worm wheel 21. Upon opening of the motor circuit and de-energization of the winding 50, the frictional force due to magnetic attraction will be released, whereby to enable an easy manual operation of the window by rotating the handle or hand crank 45 shown in the inserted position. As will be understood, in the latter case the reduction gearing 25, 26 of Figure 1 may be omitted and shaft 10 driven directly by the hand crank, in the manner shown in Figure 4.

The releasable magnetic clutch shown in Figure 4 may be of any other suitable construction adapted to apply frictional pressure between the disk 20 and worm wheel 21. Thus, in place of the winding 50, the spring washer 24 may be in the form of a coil spring compressed by a sleeve shifter or magnetic plunger which in turn is controlled by stationary solenoid winding, in the manner shown and described in further detail in the co-pending application of Peter F. Rossmann, Serial No. 3,662, filed January 22, 1946, entitled "Window Regulating Device". By connecting the solenoid in the circuit of the electric motor, sufficient friction between the disk 20 and worm wheel 21 will be provided during the automatic operation and the frictional force released or reduced during the manual operation after opening of the motor circuit, in a manner readily understood from the above.

Shaft 10 in Figure 4 may be connected to the window operating mechanism through a uni-bi-directional spring clutch, (not shown) in substantially the same manner as shown in the preceding illustrations.

According to the preceding embodiments of the invention, the hand crank for manual window control is shown to be reserved for emergency uses when the automatic system becomes inoperative or for use under any other conditions when manual rather than automatic control is desirable or necessary.

According to a further feature of the invention, the hand crank or equivalent operating member may be applied or mounted permanently to prevent its loss or displacement or for any other reasons or requirements. There is provided for this purpose, in accordance with the invention, an automatic coupling device as shown in Figures 5 and 6 designed in such a manner as to prevent rotation of the hand crank by the motor during the automatic window operation and to establish driving connection with the shaft 10 upon initially rotating the crank in either direction or releasing it at the end of the manual window operation. There is shown for this purpose in Figures 5 and 6 an automatic clutch comprising a first ring-shaped clutch member 60 secured to or integral with shaft 10 and provided with internal serrations or teeth 61. The latter are arranged to be engaged by a pair of spaced and parallel resilient prongs or pawls 62 and 63 forming part of a slotted disk or intermediate clutch member 64. The slots 65 and 66 of disk 64 are so designed as to provide an adequate resiliency for the pawls or prongs 62 and 63. The hand crank 45 is secured to a shaft 67 forming the cooperating clutch member and being suitably journaled in a wall or support 69 and guided by an extension projecting into a central bore of shaft 10. Shaft 67 carries or has secured to it a symmetrical cam 68 normally held in a central symmetrical position between the prongs 62 and 63, whereby the outer ends of the prongs are in disengaged relation to the teeth 61 of member 60.

The intermediate clutch member 64 is arranged for frictional engagement with the support 69 by the provision of a disk 70 rigidly secured thereto by riveting or the like and arranged to rotate freely upon the shaft 67. Disk 70 is in turn in resilient frictional engagement with the wall or support 69 by the provision of leaf spring elements 71 secured to support 69 and bent upon and over the outer edge of disk 70, in the manner shown in the drawing.

In operation, upon initial rotation of the shaft 67 by the hand crank 45 for manually controlling the window, either of the prongs 62 or 63, depending upon the sense of rotation, will be deflected into engagement with the teeth 61 by the action of the camming surfaces of member 68 and restraining action caused by the friction between disk 70 and support or wall 69, whereby to establish driving connection between the member 68 or shaft 67, on the one hand, and shaft 10, on the other hand, in a manner readily understood. Upon release of a crank 45, cam 68 will return to the normal or central position due to the spring action of prongs 62 and 63, thus instantly decoupling the hand crank 45 from the shaft 10. Shaft 10 may again be connected with the window operating mechanism and motor drive through any of the coupling devices as shown in the preceding views.

As is understood, the frictional force between disk 70 and support 69 should be sufficient to enable the prongs 62 and 63 to be deflected upon initially rotating the shaft 67 without causing relative slippage between members 69 and 70. Furthermore, in order to keep the friction between members 69 and 70 as low as possible and to reduce the effort to be exerted during the manual operation of the window, member 64 or the prongs 62 and 63 are made of highly resilient spring metal and/or additional means may be provided to improve the resiliency of said prongs in order to insure ready and instant deflection and engagement with the serrations 61 upon initial rotation of the shaft 67 and cam 68.

According to a further embodiment of the invention, the uni-bi-directional spring clutch of the type shown in Figure 1 is adapted for additional power driven operation by rotating the housing 18 by an electric motor through a worm gear drive, an additional clutch spring being provided to afford efficient frictional driving action between the housing and clutch assembly during the automatic or motor driven window operation. A construction of this type is shown in Figures 7 and 8.

In the latter, items 10, 11, 14 to 18 represent a spring clutch similar to that shown in Figures 1 and 2. According to this embodiment, the housing 18 instead of being stationary as in the preceding arrangements is arranged for rotation together with the entire clutch assembly by the provision of a suitable support or bearing indicated at 75 and secured to a casing 76 which serves to house the entire coupling mechanism. This is obtained by directly connecting the worm wheel 21 driven by worm 22 to the housing 18 in the manner shown in the drawing. As a result, the entire clutch assembly and with it the window driving gear 12 may be rotated by the electric motor for effecting an automatic window regulation, the normal frictional engagement of the clutch spring 16 with the inner surface of the housing 18 acting to provide the necessary coupling connection.

For practical purposes the friction between spring 16 and housing 18 should not exceed a certain limit in order to prevent an excessive frictional load to be overcome when operating the hand crank during the manual window operation. This in turn may result in a slipping between the housing 18 and clutch spring 16 during the automatic operation and in order to avoid this drawback, there is provided a further clutch spring 77 similar to spring 16 and encircling either the members 10 and 11 and/or 14 and 15. In the example shown, spring 77 is arranged adjacent to the spring 16 and encircling the shaft or coupling member 10, the hooked ends 78 of this spring engaging suitable slots 80 in the housing 18, as shown more clearly in Figure 8, in such a manner that spring 77 will be wound up or tightened upon shaft 10 upon initially rotating the housing in either direction by the worm wheel 21, whereby to establish efficient frictional driving connection with shaft 10 by way of the entire clutch assembly and in turn with the gear 12. For this purpose, the hooked ends 78 of spring 77 and slots 80 are so arranged relative to each other that the slots will engage the inner faces of hooks 78, to thereby contract the spring as desired. Spring 77 is arranged to normally engage shaft 10, sufficiently to enable contraction of the spring during initial rotation of housing 18 but with a friction small enough to prevent any excessive effort to be overcome during manual rotation of shaft 10 by the hand crank.

In order to relieve the motor from excess load when the window reaches the limit position or is restrained in any other manner, a suitable slip coupling 81 is shown connected between the motor 43 and worm gear 22. During the manual operation of the window by means of the hand crank which latter may be either permanently attached, as shown in Figures 5 and 6, or provided for emergency uses only, the worm wheel 21 will act as a lock or abutment to hold the housing 18 stationary and enable the normal operation of the spring clutch in the manner described hereinbefore. In place of the slip coupling 81, any other known overload release means may be provided for the motor 43, such as a delayed excess current circuit breaker or the like as will be readily understood.

If the hand crank in Figure 1 is intended for emergency use only, the spring clutch 14—18 may be omitted in order to simplify and reduce the cost of the entire structure. In this case, during the normal or motor driven window operation, the worm gear 21, 22 will act as a lock preventing reaction by the window upon the motor, while during the manual window operation the friction between the worm wheel 21 and disk 20 will act as a brake preventing the window from reacting upon the crank handle. On the other hand, if the friction driving force is released or reduced during the manual window operation, as in the case of Figure 4, the use of a uni-bi-directional spring clutch of the type shown or an equivalent arrangement between the window driving gear 12 and the shaft 10 is advisable.

It will also be understood that the crank handle 45 in Figure 5 may be connected to the shaft 67 through a step-down gear train similar to the gearing 25, 26 of Figure 1 in order to reduce the manual effort in overcoming the friction between the worm wheel and friction driving disk when using an arrangement of the type according to Figure 1.

Furthermore, the slip clutch 81 in Figures 7 and 8 may be omitted and the clutch springs 16 and 77 so designed or adjusted in the normal position to produce a predetermined frictional engagement with the housing 18 or shaft 10, respectively, whereby the clutch will act as an overload release means by allowing of relative slippage between the spring 16 and housing 18 and between spring 77 and shaft 10, respectively, at a predetermined excess load imposed upon the motor, when the window reaches one of its limit positions or is otherwise restrained in an intermediate position during its operation.

If a uni-bi-directional clutch is provided between the window operating gear 12 and the driving shaft, the worm gear drive, 21, 22 may be replaced by any simple drive such as a pair of bevel gears since in this case the spring clutch will serve to prevent reaction of the window upon both the motor and manual driving members.

While there have been shown and described a few desirable embodiments of the invention, it will be evident from the foregoing that this disclosure is for the purpose of illustration and that variations in shape, size and arrangement of parts, as well as the substitution of equivalent elements for those herein shown and described may be made, in accordance with the broader scope and spirit of the invention as defined in the appended claims. The specification and drawings are accordingly to be regarded in an illustrative rather than in a limiting sense.

We claim:

1. In a window regulator, operating mechanism for raising and lowering a window, means for controlling said mechanism comprising an electric motor, a power source and switch means for starting said motor in either direction, a driving shaft, rotatable gear means connecting said driving shaft to said window operating mechanism for operating the latter when the shaft is rotated, clutch means concentric with said rotatable means and connecting said shaft with rotatable means to allow of rotary motion to be transmitted in either sense of rotation from said shaft to said mechanism but blocking the transmission in the reverse direction, a friction clutch having a first clutch member in driving connection with said shaft and a second clutch member in frictional engagement with said first member, drive means between said motor and said second clutch member, and a further control member connected to said shaft for manual rotation thereof.

2. In a window regulator, operating mechanism for raising and lowering a window, means for controlling said mechanism comprising an electric motor, a power source and switch means for starting said motor in either direction, a driving shaft, rotatable means connecting said driving shaft to said window operating mechanism for operating the latter when the shaft is rotated, a worm gear rotatable on said shaft, a worm driven by said motor and meshing with said worm gear, a frictional clutch surface on one side of said worm gear, a frictional clutch element fixed against rotation on said shaft and engageable with said clutch surface, clutch means on the other side of said worm gear connecting said shaft with said rotatable means to allow of rotary motion to be transmitted in either sense of rotation from said shaft to said mechanism but blocking the transmission in the reverse direction, and a further control member disengageably connected to said shaft for manually operating said window.

3. In a device as claimed in claim 2, including speed reduction gearing between said shaft and control member.

4. In a window regulator, operating mechanism for raising and lowering a window, means for controlling said mechanism comprising an electric motor with means for starting the same in either direction, a driving shaft, rotatable gear means connecting said driving shaft to said window operating mechanism for operating the latter when the shaft is rotated, clutch means concentric with said rotatable means and connecting said shaft with said rotatable means to allow rotary motion to be transmitted in either sense of rotation from said shaft to said mechanism but blocking the transmission in the reverse direction, a magnetic clutch including a first clutch member connected to said shaft and a second clutch member in engagement with said first member, a magnetic winding on one of said members for effecting friction driving connection between said members, said winding causing such friction driving connection without substantial axial movement of said clutch members, means for energizing and deenergizing said winding simultaneously with the operation of said motor, and a further control member connected to said shaft for manual rotation thereof.

5. In a window regulator, operating mechanism for raising and lowering a window, means for controlling said mechanism comprising an electric motor with means for starting the same in either direction, a driving shaft, rotatable gear means connecting said driving shaft to said window operating mechanism for operating the latter when the shaft is rotated, clutch means concentric with said rotatable means and connecting said shaft with said rotatable means to allow rotary motion to be transmitted in either sense of rotation from said shaft to said mechanism but blocking the transmission in the reverse direction, a magnetic clutch including a first clutch member connected to said shaft and a second clutch member in engagement with said first member, a magnetic winding on one of said clutch members, means engageable with the other of said clutch members to prevent substantial axial movement thereof, means for energizing and deenergizing said winding simultaneously with the operation of said motor, and a further control member connected to said shaft for manual rotation thereof.

PETER F. ROSSMANN.
KARL RATH.

REFERENCES CITED

The following references are of record in the file of this patent:

UNITED STATES PATENTS

| Number | Name | Date |
| --- | --- | --- |
| 665,321 | Garrett | Jan. 1, 1901 |
| 865,866 | Chandeysson | Sept. 10, 1907 |
| 1,040,863 | Blaxter | Oct. 8, 1912 |
| 1,361,221 | Bentley | Dec. 7, 1920 |
| 1,651,959 | Myers | Dec. 6, 1927 |
| 1,997,646 | Miller | Apr. 16, 1935 |
| 2,001,758 | Zwierzina | May 21, 1935 |
| 2,145,666 | Roethel | Jan. 31, 1939 |
| 2,284,353 | Allen | May 26, 1942 |
| 2,315,110 | Dornier | Mar. 30, 1943 |
| 2,324,145 | Floraday | July 13, 1943 |
| 2,334,581 | Pyne | Nov. 16, 1943 |
| 2,337,902 | Lakin | Dec. 28, 1943 |
| 2,370,580 | Pyne et al. | Feb. 27, 1945 |
| 2,387,613 | Ryba | Oct. 23, 1945 |